April 25, 1961 J. LUDEMANN ET AL 2,981,856

ALTERNATING CURRENT MOTOR STATORS

Filed Aug. 16, 1956 2 Sheets-Sheet 1

Inventors
JOSEPH LUDEMANN
PAUL JANECKE
By Taulmin & Taulmin
Attorneys

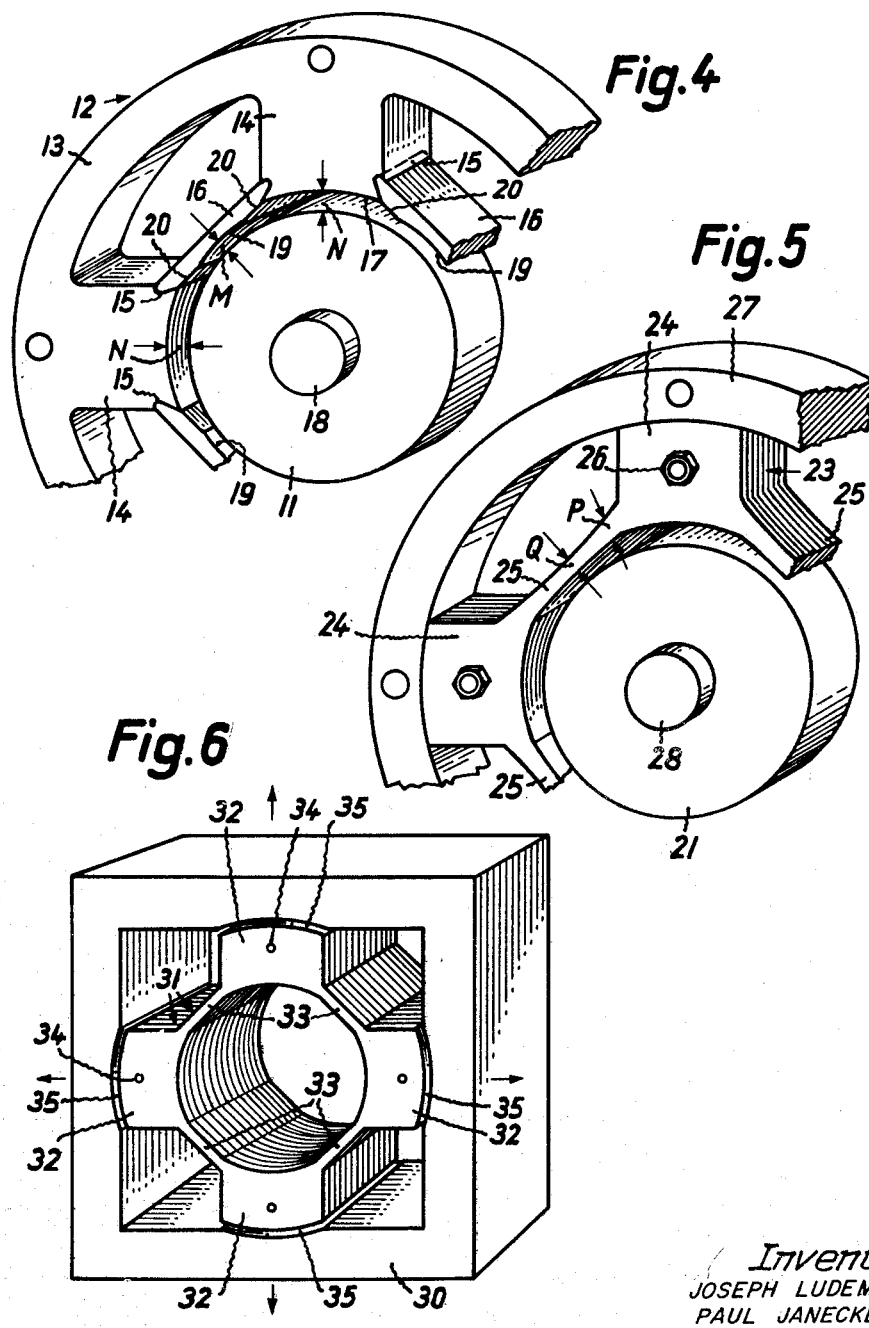

United States Patent Office 2,981,856
Patented Apr. 25, 1961

2,981,856
ALTERNATING CURRENT MOTOR STATORS

Joseph Ludemann and Paul Janecke, Oldenburg, Germany, assignors to Licentia Patent-Verwaltungs-G.m.b.H., Hamburg, Germany Filed Aug. 16, 1956, Ser. No. 604,571

4 Claims. (Cl. 310—256)

This invention relates to improvements in the construction of stators of alternating current motors and, especially, in the construction of stators having distinct pole blocks or laminated pole stacks for such motors.

The invention relates more particularly to improvements in the arrangement of the stray field absorbing means provided with laminated stack or single pole block stators of alternating current motors.

It is an object of our invention to provide improved stray field absorbing means for the aforesaid stators of alternating current motors thank to which means one may obtain a particularly favorable field distribution in the air gap of the motor.

It is another object of our invention to provide improved stray field absorbing means for the stators of alternating current motors thanks to which means a particularly simple and stable assembly is obtained.

It is yet another object of our invention to provide improved stray field absorbing means for the aforesaid stators of alternating current motors which show no tendency to vibrate.

In the known construction of small alternating current motors for polyphase operation as well as single-phase operation with auxiliary phases, the poles of the stator are often built from laminated stacks or punched out as single pole blocks between adjacent stator poles about the rotor, stray field absorbing means are arranged which are either provided in the form of stray field plates inserted in grooves along the longitudinal edges of adjacent stator poles. Alternatively, these absorbing means take the form of a cylindrical sleeve surrounding the rotor, which sleeve is pressed into the central bore housing so as to surround the latter, and singly contact the control surfaces of all poles.

In order to limit the stray flux from pole to pole across the stray field straps or plates and improve the electrical properties of the motor, i.e. to obtain a favorable phase shift between the main pole flux and the auxiliary pole flux or gap pole flux, as the case may be, the stray field plates are provided with one or several slots or with a number of holes disposed in a direction parallel to the central axis of the motor, or in a direction inclined thereto.

The conventional insertion of stray field plates in between the adjacent poles meets with difficulties due to the tolerance required for the pole grooves and the corresponding stray field plate dimension.

Any outward bending of the stray field plates, the cross section of which is anyhow weakened by the slots or holes provided therein, signifies a change in the width of the air gap and consequently a change in the distribution of field flux in the gap.

This means, of course, a loss of power for the motor.

The same disadvantage may occur if the stray field plates or straps are not sufficiently firmly seated in the grooves of the pole. Moreover, in this case, they tend to vibrate. If the stray field absorbing means consist of a cylindrical sleeve the same difficulties of tolerances occur during manufacture of the stator. Another disadvantage of the stray field sleeve resides in the tendency to form eddy currents in the same, in particular immediately below the pole surfaces in contact with the sleeve.

According to another known construction it has been attempted to overcome these drawbacks by manufacturing the laminated stator blocks as a parcel of punched out star-shaped laminations having stray field straps or bridges between each pole segment. The outwardly lying end edges of the laminations form an interrupted circular circumference, about which there is placed a yoke ring to hold them together. However, in order to avoid deformation of the pole and stray field strap laminations during the press-seating of the annular yoke thereabout, the recessed stray field straps between the poles must be sufficiently strong, i.e. of a determined minimum diameter.

Since it is not possible, in this known construction, to provide slots or holes in the stray field straps or bridges, there exists in these kinds of motors a determined stray flux which cannot be decreased below a certain value depending on the thickness of the stray field straps. This, in turn, leads to an undesirable limitation of the electrical output, i.e. in particular the power output of the motor.

The aforesaid drawbacks are largely overcome, and the object of our invention is attained by a construction of a stator for the aforesaid types of motor which stator has the above described inserted stray field plates or punched stray field straps or bridges. A main feature of our invention is that the width of the air gap between the rotor and the surrounding stator elements is smaller between the rotor and the stray field plates or straps, in particular in the central portion of the latter, than between the rotor and those portions of the stator formed by the internal surfaces of the distinct poles. Thereby, the stray flux in the plates or straps is reduced or, in other words, distributed in such a manner that a more favorable overall field distribution is achieved between stator and rotor. For the latter approaches more a sinus-shaped field distribution, and the share of oppositely directed rotating fields is reduced with a consequent reduction of power losses in the motor.

Due to the air gap being narrower in the center region of the stray field plates or straps, the magnetic resistance from the plates or straps to the rotor is reduced which leads in turn to a reduction of the stray flux in these absorbing elements and consequently to the above-mentioned improved field distribution. Therefore, it is no longer necessary to provide the slots or holes in the stray field absorbing elements hitherto required for reducing the stray flux therein.

This, in turn, makes possible for greater strength of the stray field absorbing elements against binding or other deformation and prevents their tendency to vibrate. It is further possible to somewhat reduce the cross-sectional diameter of the stray field elements in their central portion, whereby the magnetic flux is directed less through these elements and more through the rotor because of the increased magnetic resistance offered by an element of reduced cross sectional area.

The nature of our invention will be still better understood by the detailed description thereof in connection with the accompanying drawings in which:

Figure 4 shows yet another embodiment of the stator construction according to the invention wherein the stator comprises an integral annular yoke and pole members inserted having insert stray field plates.

Figure 5 shows a further embodiment of the invention having a composite stator assembly.

Figure 6 shows a fifth embodiment of the invention wherein the stator assembly comprises a polygonal yoke surrounding poles formed by a laminated stack.

Figures 1, 2, 3:
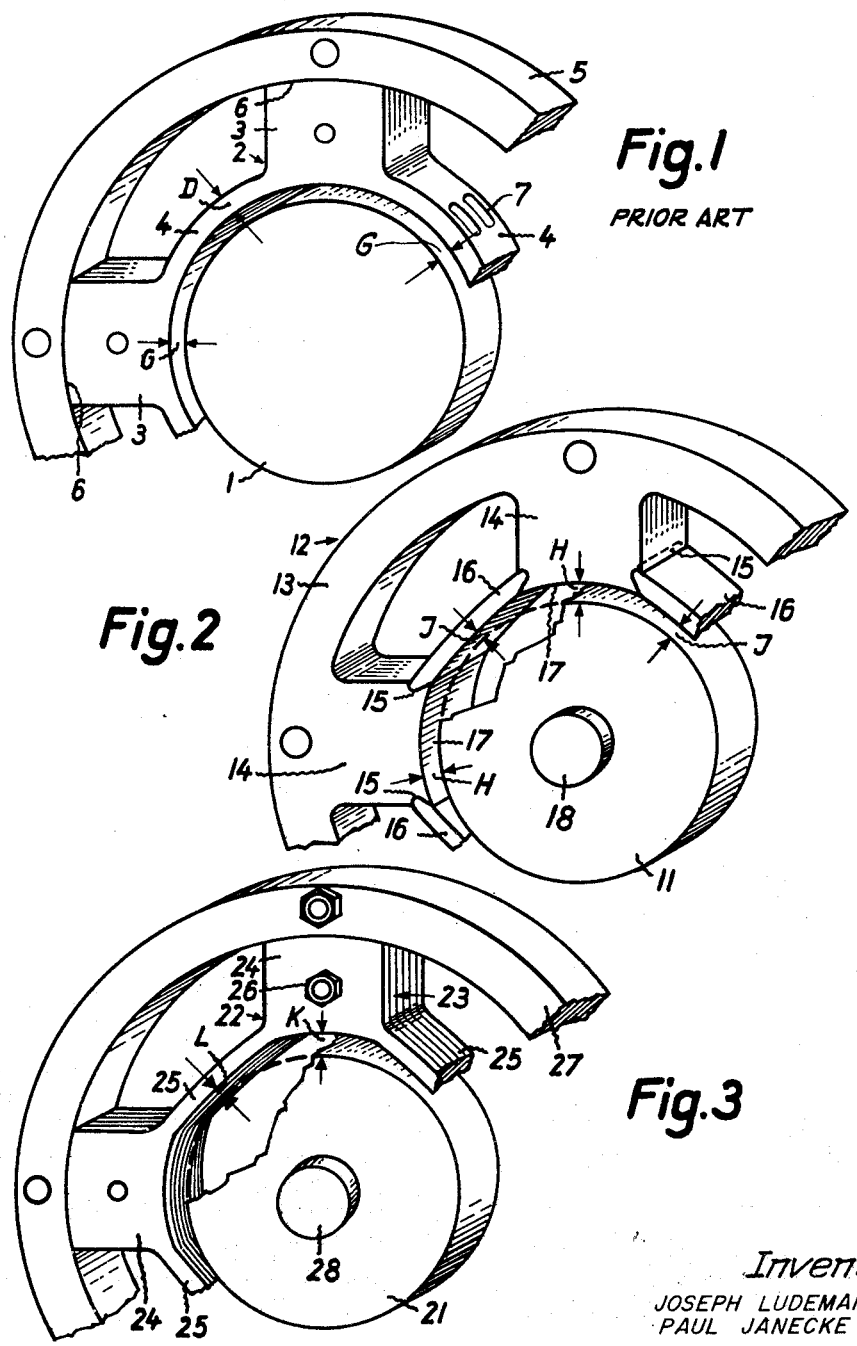
Figure 1 illustrates in perspective a fractional view of a conventional assembly of a stator manufactured of unitary pole members forming an integral body with intermediary stray field straps or bridges.
Figure 2 shows a first embodiment of the stator construction according to the invention wherein stray field plates are inserted between the unitary pole members of the stator.
Figure 3 shows another embodiment of the stator construction according to the invention, wherein the stator comprises poles formed by laminated stacks, and punched as star shaped laminations having stray field absorbing bridges between adjacent poles.

In the known stator assemblies as illustrated in Figure 1, rotor 1 is surrounded by a star shaped punched pole assembly 2 comprising distinct poles 3 and stray field bridges 4. The poles are surrounded by an annular yoke 5 fitting tightly on the outer surfaces 6 of the poles. The stray field bridges 4 have slots 7 to reduce the stray flow therethrough. The cross sectional diameter D of the bridges 4 is constant and, consequently, the width G of the air gap is the same between the rotor and the poles as between the rotor and the central region of the stray field absorbing bridges.

According to the invention, the alternating current motor shown in Figure 2 comprises a rotor 11 and a stator 12; stator 12 is formed by an integral yoke ring 13 and pole elements 14. At their axially directed inner edges the poles 14 are provided with longitudinal grooves 15 in which there are inserted flat stray field absorbing bridge members 16, also called "pole wedges."

Since the curvature of the bridge members 16 has a greater radius than the internal end surfaces 17 of the poles, the width of air gap H between the rotor 11 and surface 17 is larger than the width of the air gap J between the rotor and the central region of plates 16. By this arrangement the width of the air gap between rotor and stator is steadily decreasing from the pole region to the central region of the stray field plates. The latter can be of greater thickness and are easier to mount in grooves 15.

Reference numeral 18 indicates the shaft of the rotor.

In the embodiment shown in Figure 3 the rotor 21 is surrounded by a stack 22 of star-shaped laminations 23 each of which comprises pole sections 24 and stray field straps 25; these straps are so shaped that the air gap L between them and rotor 21 is narrower than air gap K between the rotor and pole sections 24. The stack 22 is held together by bolt and screw means 26 and by an annular yoke 27. The rotor 21 is mounted on shaft 28.

The air gap in this embodiment width shows a steady decrease from K to L.

In the preferred embodiment shown in Figure 4 which is generally identical with that of Figure 2 as is indicated by like reference numerals for like parts, the inner surfaces 19 of stray field plates 16 are outwardly curved in the central region of the plates. Thereby the air gap width M in the central plate region is maintained constant while it increases along the marginal regions 20 of the plates 16 to reach the larger constant air gap width N between the rotor and the inner surfaces of the poles.

The curved inner surface 19 between marginal portion 20 may coincide with the central region of stray field plate 16. However, it may also be laterally displaced relative to the center of plate 16, so that one marginal portion 20 will be larger than the other. Thereby the angular field relative to the rotor is slightly displaced, which greatly facilitates starting these alternating current motors.

In the embodiment of Figure 5 which is similar to that shown in Figure 3, like numerals designating like parts in both figures, the stray field absorbing bridges 25 have a varying diameter P with their narrowest diameter Q in the central region of the bridges 25. Thereby the magnetic flux through the bridges is restricted as has been explained hereinbefore.

Finally, in Figure 6, there is illustrated a stator assembly having a polygonal yoke 30 surrounding the pole and stray plate assembly 31. The poles 32 and stray field straps 33 form integral star-shaped laminations, several of which are held together by nut and bolt means 34 to form the stator stack.

This arrangement of a polygonal yoke has the advantage of the yoke contacting the outer surfaces of the poles in a lightly resilient manner. Resiliency is indicated by the arrows in Figure 6. Thereby, slight inaccuracies of the outer stator dimensions do not cause distortions in the central bore for the rotor as would be the case when pressing an annular yoke on to the stator poles. Furthermore, manufacture is facilitated by providing curved contact surfaces 35, between the yoke and the poles similar to those shown in the preceding figures.

It is understood that the various modifications of stray field plates and bridges or straps, are only shown by way of example, and that our invention is not limited to their application as shown in the drawings, but rather that our invention comprises all those modifications that fall within the scope of the appended claims.

What we claim is:

1. In an alternating current electric motor comprising a rotor, a stator having a plurality of poles with the inner ends of said poles being spaced from said rotor to form an air gap between said poles and said rotor, a yoke ring surrounding said stator poles and abutting the outer ends of said poles, and bridge means mounted between axially directed inner edges of adjacent poles at the inner ends thereof spaced from said rotor for absorbing stray field flux, the radius of curvature of said bridge means being greater than the radius of curvature of the inner ends of said poles so that the central portions of said bridge means are closer to said rotor than the inner ends of said poles so as to reduce the radial distance of the air gap under the central portions of said bridge means with respect to the air gap under said poles.

2. In an alternating current electric motor comprising a rotor, a stator having a plurality of poles with the inner ends of said poles being spaced from said rotor to form an air gap between said poles and said rotor, a yoke ring surrounding said stator poles and abutting the outer ends of said poles, and bridge means mounted between axially directed inner edges of adjacent poles at the inner ends thereof spaced from said rotor for absorbing stray field flux, the radius of curvature of said bridge means being greater than the radius of curvature of the inner ends of said poles so that the central portions of said bridge means are closer to said rotor than the inner ends of said poles so as to reduce the radial distance of the air gap under the central portions of said bridge means with respect to the air gap under said poles, said bridge means having a cross sectional area which gradually decreases to a minimum at the central portion thereof.

3. In an alternating current electric motor comprising a rotor, a stator having a plurality of poles with the inner ends of said poles being spaced from said rotor to form an air gap between said poles and said rotor, a yoke ring surrounding said stator poles and abutting the outer ends of said poles, there being a resilient connection at the contact surfaces between the outer ends of said poles and said yoke ring, said contact surfaces comprising arcuate segments of a common cylindrical surface which is co-axial with the rotational axis of said rotor so as to facilitate determination of the position and dimensions of said air gap, and bridge means mounted between axially directed inner edges of adjacent poles at the inner ends thereof spaced from said rotor for absorbing stray field flux, the radius of curvature of said bridge means being greater than the radius of curvature of the inner ends of said poles so that the central portions of said bridge means are closer to said rotor than the inner ends of said poles so as to reduce the radial distance of the air gap under the central portions of said bridge means with respect to the air gap under said poles.

4. In an alternating current electric motor comprising a rotor, a stator having a plurality of salient poles with the inner ends thereof being spaced from said rotor to form an air gap between said poles and said rotor, a yoke ring surrounding said stator poles and abutting the outer ends of said poles, and bridge means mounted between axially directed inner edges of adjacent poles at the inner ends thereof and being spaced from said rotor for absorbing stray field flux, said bridge means including an intermediate portion defining an air gap between said intermediate portion and said rotor smaller than said air gap between said poles and said rotor, said intermediate portion including a region of constant minimum radial distance between said bridge means and said rotor.

References Cited in the file of this patent
UNITED STATES PATENTS

| | | |
|---|---|---|
| 1,688,891 | Spreen | Oct. 23, 1928 |
| 1,979,665 | Blankenbeuhler | Nov. 6, 1934 |
| 2,012,368 | Zetsche | Aug. 27, 1935 |

FOREIGN PATENTS

| | | |
|---|---|---|
| 233,235 | Germany | Apr. 11, 1911 |
| 894,734 | Germany | Oct. 26, 1953 |